(12) United States Patent
Park

(10) Patent No.: US 11,970,412 B2
(45) Date of Patent: *Apr. 30, 2024

(54) UNDERWATER PLASMA DISCHARGE DEVICE AND WATER TREATMENT SYSTEM USING SAME

(71) Applicant: DOOSAN ENERBILITY CO., LTD, Changwon (KR)

(72) Inventor: Yong Hae Park, Busan (KR)

(73) Assignee: DOOSAN ENERBILITY CO., LTD., Changwon (KR)

(*) Notice: Subject to any disclaimer, the term of this patent is extended or adjusted under 35 U.S.C. 154(b) by 231 days.

This patent is subject to a terminal disclaimer.

(21) Appl. No.: 17/343,660

(22) Filed: Jun. 9, 2021

(65) Prior Publication Data

US 2021/0395115 A1 Dec. 23, 2021

(30) Foreign Application Priority Data

Jun. 23, 2020 (KR) .................. 10-2020-0076234

(51) Int. Cl.
*C02F 1/46* (2023.01)
*C02F 1/24* (2023.01)
*C02F 1/52* (2023.01)

(52) U.S. Cl.
CPC .............. *C02F 1/4608* (2013.01); *C02F 1/24* (2013.01); *C02F 1/5281* (2013.01); *C02F 2201/46* (2013.01)

(58) Field of Classification Search
CPC .................................................. C02F 1/4608
See application file for complete search history.

(56) References Cited

U.S. PATENT DOCUMENTS

| 10,093,554 B2* | 10/2018 | Park | C02F 1/5209 |
| 11,485,658 B2* | 11/2022 | Park | C02F 1/78 |
| 2019/0016612 A1* | 1/2019 | Park | C02F 1/4608 |

FOREIGN PATENT DOCUMENTS

| KR | 100174364 B1 | 2/1997 |
| KR | 200212210 B1 | 2/2001 |
| KR | 101052486 B1 | 10/2008 |
| KR | 101977787 B1 | 5/2019 |
| KR | 20190127645 A | 11/2019 |
| KR | 20200022960 A | 3/2020 |
| KR | 20200025145 A | 3/2020 |
| KR | 102097717 B1 | 4/2020 |

OTHER PUBLICATIONS

KR OA dated Jan. 28, 2022.
The KR Office Action, dated Dec. 1, 2022.

* cited by examiner

*Primary Examiner* — Peter Keyworth
(74) *Attorney, Agent, or Firm* — Harvest IP Law, LLP

(57) ABSTRACT

A plasma electrode module, an underwater plasma discharge device including the plasma electrode module, and a water treatment system are provided. The plasma electrode module includes a conductive substrate including a plurality of holes, a ceramic layer surrounding a portion of the outer surface of the conductive substrate, and a plasma electrode disposed in each of the plurality of holes, wherein the plasma electrode has a multilayer structure in which a cylindrical ground portion, a fixed portion, and a discharge portion are sequentially stacked, the ground portion is in contact with the conductive substrate and plasma is generated on the discharge portion, and each of the plurality of holes has a diameter in a range of 1 mm to 10 mm.

13 Claims, 5 Drawing Sheets

UNDERWATER PLASMA DISCHARGE DEVICE AND WATER TREATMENT SYSTEM USING SAME

CROSS REFERENCE TO RELATED APPLICATION

This application claims priority to Korean Patent Application No. 10-2020-0076234, filed on Jun. 23, 2020, the disclosure of which is incorporated herein by reference in its entirety.

BACKGROUND

1. Field

Apparatuses and methods consistent with exemplary embodiments relate to an underwater plasma discharge device and a water treatment system using the same, and more particularly, to an underwater plasma discharge device capable of improving water treatment efficiency by increasing the production of bubbles during underwater plasma discharge and a water treatment system using the same.

2. Description of the Related Art

For wastewater or sewage treatment, sedimentation has been widely used so far. Sedimentation for water treatment is a method of removing pollutants from raw water by gradually depositing pollutants on a bottom of a settling tank by gravity and then separating the purified water generated in the settling tank from the pollutants deposited on the bottom of the settling tank. However, this sedimentation method has drawbacks that it is time-consuming and requires a large footprint. Furthermore, the sedimentation water treatment method has a more serious problem of causing an odor due to the decay of the sediment during the sedimentation water treatment.

For this reason, many efforts have been made to develop various water treatment methods that can treat wastewater with a small footprint. Among them, there is a pressure flotation method which is currently extensively used in industrial water treatment plants. This method generates, in water, air bubbles which will adhere to pollutants and float the pollutants to the water surface where the pollutants are removed from the water.

Among various types of the pressurized flotation methods, the most frequently used water treatment method is dissolved air flotation (DAF), which is widely used in wastewater treatment plants. This method generates microbubbles having a size of 100 μm or less by injecting water saturated above atmospheric pressure into a flotation tank through a nozzle or needle valve.

However, such a related art dissolved air flotation (DAF) method has a disadvantage of a small treatment capacity per unit area. Therefore, it has been usually used in only small-scale water treatment plants. Furthermore, because the size of bubbles is determined by the structure of nozzles, it was impossible to adaptively adjust the size of bubbles after installing a dissolved air flotation facility. In addition, a pressure vessel for generating air-saturated water at a high pressure over atmospheric pressure requires high power consumption, and the cost of power makes up a large portion of the total operating cost. In addition, there is a problem in that organic matters, such as algae, do not adhere well to bubbles or flocs, but rather are suspended in water. That is, it is difficult to remove this type of organic matter using sedimentation or air flotation. In order to solve these problems, improved methods such as addition of chlorine have been proposed. However, the chlorine addition caused new problems such as corrosion of parts due to overdose of chlorine.

Therefore, there is a need to develop a water treatment apparatus capable of effectively removing organic matter and microorganisms present in raw water to be treated while eliminating the above disadvantages.

SUMMARY

Aspects of one or more exemplary embodiments provide an underwater plasma discharge device capable of improving water treatment efficiency by increasing production of bubbles during underwater plasma discharge, and a water treatment system using the same.

Additional aspects will be apparent in part in the description which follows and, in part, will become apparent from the description from the following description, or may be learned by practice of the exemplary embodiments.

According to an aspect of an exemplary embodiment, there is provided a plasma electrode module including: a conductive substrate including a plurality of holes; a ceramic layer surrounding a portion of an outer surface of the conductive substrate; and a plurality of plasma electrodes disposed in each of the plurality of holes, wherein the plasma electrode has a multilayer structure in which a cylindrical ground portion, a fixed portion, and a discharge portion are sequentially stacked, the ground portion is in contact with the conductive substrate and plasma is generated on the discharge portion, and each of the plurality of holes has a diameter in a range of 1 mm to 10 mm.

The conductive substrate may have a plate shape or a cylinder shape.

The ground portion, the fixed portion, and the discharge portion may be integrally formed in a cylindrical structure and may be made of a same material having corrosion resistance.

The discharge portion disposed at a top may have a smallest diameter and the ground portion disposed at a bottom may have a largest diameter so that a diameter of the plasma electrode decreases toward the top.

The ground portion, the fixed portion, and the discharge portion may be made of stainless steel (STS).

The discharging portion may have a diameter in a range of longer than 1 mm and shorter than 4 mm.

The plurality of holes may be spaced at intervals ranging from 90 to 120 mm.

According to an aspect of another exemplary embodiment, there is provided an underwater plasma discharge device including: a reactor having an input port through which raw water flows in and an output port through which treated water flows out; a ground electrode disposed in a first side of the reactor; and a plasma electrode module disposed in a second side of the reactor and configured to generate plasma. The plasma electrode module may include a conductive substrate including a plurality of holes, a ceramic layer surrounding a portion of an outer surface of the conductive substrate, and a plurality of plasma electrodes disposed in each of the plurality of holes, wherein the plasma electrode has a multilayer structure in which a cylindrical ground portion, a fixed portion, and a discharge portion are sequentially stacked, the ground portion is in contact with the conductive substrate and plasma is generated on the discharge portion generates plasma, and each of the plurality of holes has a diameter in a range of 1 mm to 10 mm.

The conductive substrate may have a plate shape or a cylinder shape.

The ground portion, the fixed portion, and the discharge portion may be integrally formed in a cylindrical structure and may be made of a same material having corrosion resistance. The discharge portion disposed at a top may have a smallest diameter, and the ground portion disposed at a bottom may have a largest diameter so that a diameter of the plasma electrode decreases toward the top.

The plurality of holes may be spaced at intervals ranging from 90 to 120 mm.

The input port, the output port, and the ground electrode may be disposed at a same side of the reactor.

The ground electrode and the plasma electrode module may be disposed to face each other.

According to an aspect of another exemplary embodiment, there is provided a dissolved air flotation water treatment system including: a mixing-and-coagulation basin in which a mixture of feed water and coagulant flows in and agitates the mixture to form and grow flocs; and a flotation basin in which micro-bubbles are injected into treated water supplied from the mixing-and-coagulation basin so that the flocs are raised. An underwater plasma discharge device is disposed in the flotation basin to generate plasma and micro-bubbles through underwater electric discharge.

At least one underwater plasma discharge device may be provided in the flotation basin.

The underwater plasma discharge device may include: a reactor having an input port through which raw water flows in and an output port through which treated water flows out; a ground electrode disposed in a first side of the reactor; and a plasma electrode module disposed in a second side of the reactor and configured to generate plasma.

The plasma electrode module may include: a conductive substrate including a plurality of holes; a ceramic layer surrounding a portion of an outer surface of the conductive substrate; and a plurality of plasma electrodes disposed in each of the plurality of holes, wherein the plasma electrode has a multilayer structure in which a cylindrical ground portion, a fixed portion, and a discharge portion are sequentially stacked, the ground portion is in contact with the conductive substrate and plasma is generated on the discharge portion, and each of the plurality of holes has a diameter in a range of 1 mm to 10 mm.

The conductive substrate may have a plate shape or a cylinder shape.

The ground portion, the fixed portion, and the discharge portion may be integrally formed in a cylindrical structure and may be made of a same material having corrosion resistance. The discharge portion disposed at a top may have a smallest diameter, and the ground portion disposed at a bottom may have a largest diameter so that a diameter of the plasma electrode decreases toward the top.

The plurality of holes may be spaced at intervals ranging from 90 to 120 mm.

According to one or more exemplary embodiments, the underwater plasma discharge device has the effect of improving water treatment efficiency by considerably increasing the production of bubbles.

In the case of a dissolved air flotation (DAF) system with an underwater plasma discharge device, because the underwater plasma discharge device can replace a saturator that have been used to generate bubbles, it is possible to reduce operational expenses of a water treatment system and to improve water treatment efficiency of the water treatment system.

BRIEF DESCRIPTION OF THE DRAWINGS

The above and other aspects will be more apparent from the following description of the exemplary embodiments with reference to the accompanying drawings, in which.

DETAILED DESCRIPTION

Figure 1:
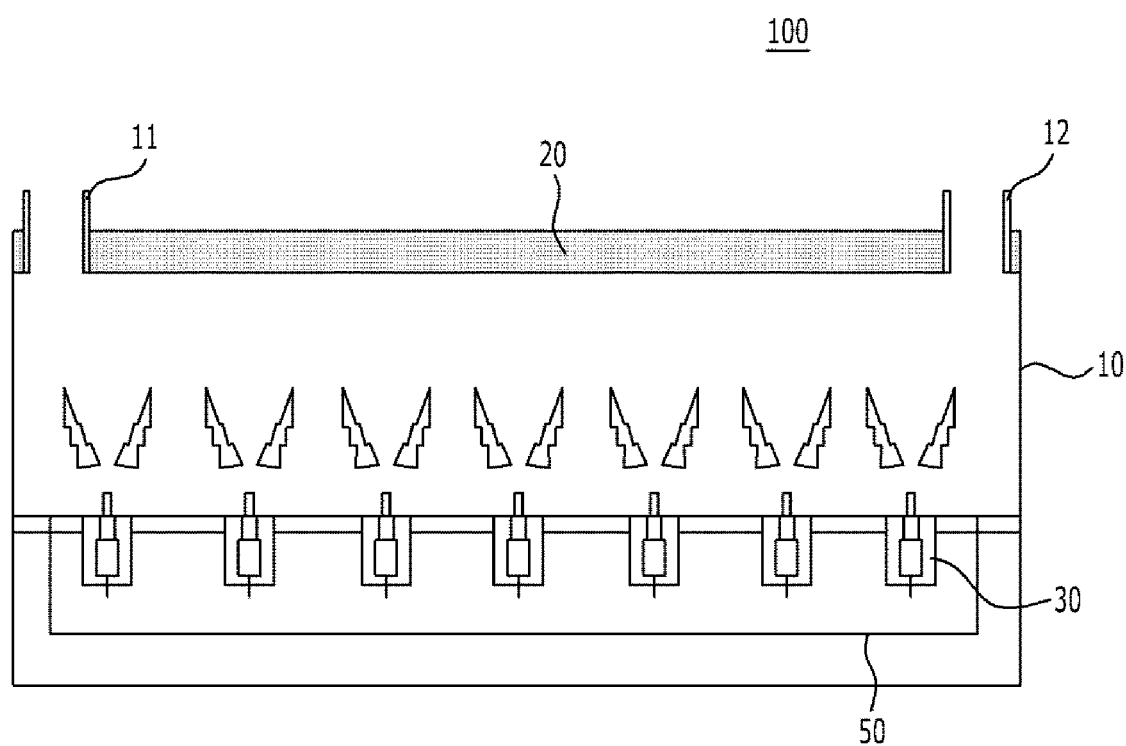
FIGS. 1 and 2 are schematic views illustrating an underwater plasma discharge device according to an exemplary embodiment.

Various modifications may be made to the embodiments of the disclosure, and there may be various types of embodiments. Thus, specific embodiments will be illustrated in drawings, and the embodiments will be described in detail in the description. However, it should be noted that the various embodiments are not for limiting the scope of the disclosure to a specific embodiment, but they should be interpreted to include all modifications, equivalents or alternatives of the embodiments included in the ideas and the technical scopes disclosed herein.

In this specification, terms such as "comprises," "includes" and/or "have/has" should be construed as designating that there are such features, regions, integers, steps, operations, elements, components, and/or a combination thereof in the specification, not to exclude the presence or possibility of adding of one or more of other features, regions, integers, steps, operations, elements, components, and/or combinations thereof.

Terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

In an exemplary embodiment, "a module," "a unit," or "a part" performs at least one function or operation, and may be realized as hardware, such as a processor or integrated circuit, software that is executed by a processor, or a combination thereof. In addition, a plurality of "modules," a plurality of "units," or a plurality of "parts" may be integrated into at least one module or chip and may be realized as at least one processor except for "modules," "units" or "parts" that should be realized in a specific hardware.

Hereinafter, exemplary embodiments will be described in detail with reference to the accompanying drawings. However, the disclosure may be embodied in many different forms and is not limited to the embodiments described herein, and those skilled in the art may implement various modified forms of the contents described herein without departing from the scope of the disclosure. In order to clearly illustrate the disclosure in the drawings, some of the elements that are not essential to the complete understanding of the disclosure may be omitted, and like reference numerals refer to like elements throughout the specification.

Figure 2:
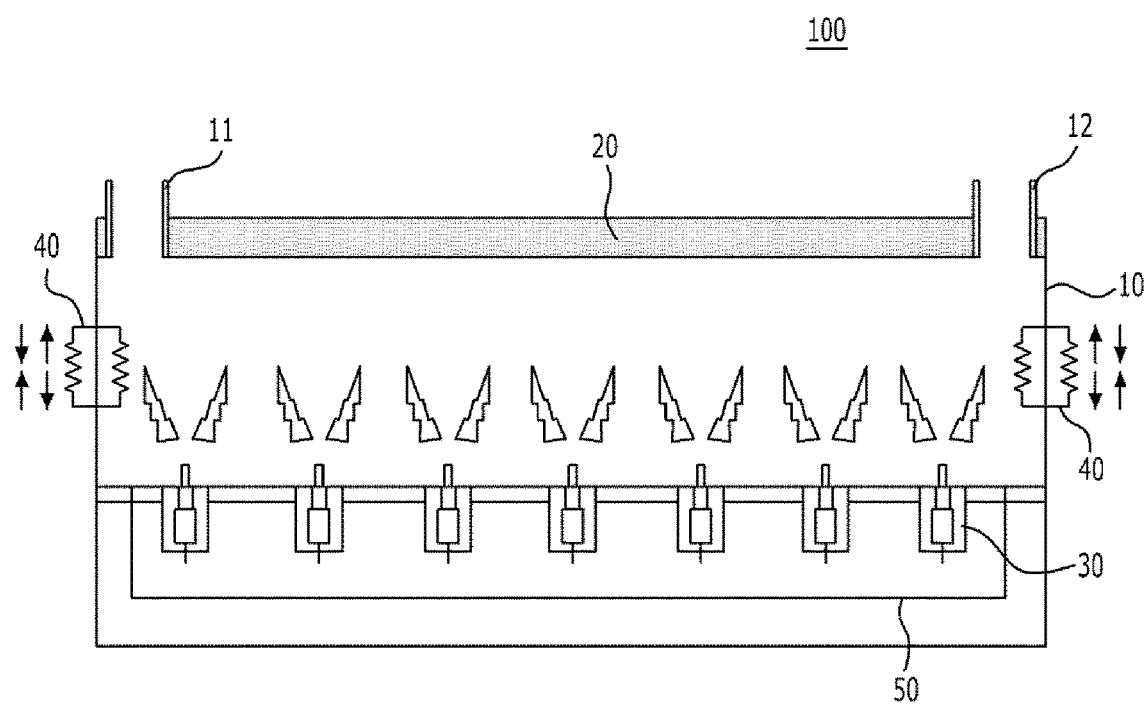

FIGS. 1 and 2 are schematic views illustrating an underwater plasma discharge device 100 according to an exemplary embodiment.

Referring to FIGS. 1 and 2, the underwater plasma discharge device 100 according to an exemplary embodiment includes a reactor 10 having an input port 11 through which raw water is fed and an output port 12 through which treated water is discharged, a ground electrode 20 disposed in a first side of the reactor 10, and a plasma electrode module 50 disposed in a second side of the reactor 10 and configured to generate plasma.

The underwater plasma discharge device 100 performs electric discharge in water to generate underwater plasma, and dissociates or removes organic materials and microorganisms present in the raw water to prevent biofouling. In addition, the underwater plasma discharge device 100 generates gas such as oxygen, ozone, and hydrogen through underwater electric discharge and releases the gas in the form of micro-bubbles. Therefore, when the underwater plasma discharge device 100 is applied to a water treatment process such as dissolved air floatation (DAF), micro-bubbles raise flocs to the water surface and the flocs are removed from the water surface.

In a related art, chlorine was injected into raw water such as seawater before pretreatment of the raw water to suppress bio-fouling caused by organic materials. However, the related art technology poses problems such as corrosion of parts of a water treatment system due to excessive injection of chlorine. In contrast, according to the exemplary embodiment, organic materials and microorganisms are effectively removed using underwater discharge plasma to suppress bio-fouling, instead of chlorine. Therefore, the exemplary embodiment has the advantage of preventing bio-fouling without causing corrosion of parts of a water treatment system. In addition, because the exemplary embodiment can generate micro-bubbles without using an additional air saturator, it is possible to improve the water treatment efficiency of the DAF water treatment system.

For example, a pulse or voltage applied to a plasma electrode 30 of the underwater plasma discharge device 100 is changed for corona discharge or arc discharge to generate underwater discharge plasma. The underwater discharge plasma purifies water through cell disruption by shock waves, by ultrasonic waves, or a high voltage electric field, and so forth.

The cell disruption by a shock wave is based on the principle that a rapid pressure change causes a shock wave which destroys cells. In this case, the cell disruption depends on the size, shape, and thickness of cells, and the intensity of the shock wave.

The cell disruption by an ultrasonic wave is based on the principle that an ultrasonic wave causes cavitation while propagating through a liquid medium. The cavitation is a phenomenon in which a vibrating longitudinal wave is produced when an ultrasonic wave generated by an ultrasonic transducer passes through a liquid medium. The vibrating longitudinal wave creates a dense zone with a high liquid density and a scarce zone with a low liquid density. When the pressure in the scarce zone is lower than the vapor pressure of the liquid, bubbles are generated and burst. That is, cells are destroyed by a shock wave generated by bubbles burst. This method is usually used to destroy a small number of microbial cells.

The cell disruption by a high voltage electric field is a method of breaking an insulator called a cell membrane by inducing a high potential difference in the cell membrane. Therefore, the survival rate of plankton and bacteria can be drastically reduced by the comprehensive action of ultraviolet rays, active species, shock waves, and bubbles generated during plasma discharge.

The reactor 10 includes the input port 11 through which raw water is fed to the reactor 10 and the output port 12 through which purified water is discharged from the reactor 10. The reactor 10 can contain raw water to be treated. The type of the reactor 10 is not limited and can be formed in various shapes. For example, the reactor 10 may have a rectangular parallelepiped shape. The first side of the reactor 10 is provided with the ground electrode 20 and the second side of the reactor 10 is provided with the plasma electrode module 50 including the plasma electrode 30 that generates plasma.

While positions of the input port 11 and the output port 12 are not particularly limited, it is preferable that the input port 11 and the output port 12 are disposed on the same side (i.e., same plane) when the reactor 10 has a rectangular parallelepiped shape. It is preferable that the ground electrode 20, the input port 11, and the output port 12 are provided on the same side, and the plasma electrode 30 is preferably arranged to face the ground electrode 20. In this case, the ground electrode 20 having a flat plate shape may serve as an upper surface of the reactor 10, and the input port 11 and the output port 12 are formed to pass through the ground electrode 20.

Referring to FIG. 2, the reactor 10 may include a gap adjuster 40 that adjusts a gap between the ground electrode 20 and the plasma electrode 30 located in the plasma electrode module 50. The voltage applied to the plasma electrode 30 and the gap between the ground electrode 20 and the plasma electrode 30 may be adjusted according to type or quality of raw water to be treated. The gap adjuster 40 includes components that are arranged to respectively the first side surface and the second side surface of the reactor 10 to reduce or increase the height of the reactor 10, in which the first side surface and the second side surface are opposite to each other. In this way, the gap adjuster 40 adjusts the feed water storage capacity of the reactor 10 and the gap between the ground electrode 20 and the plasma electrode 30.

The ground electrode 20 may be a commonly used electrode and is disposed on one side of the reactor 10 (i.e., the first side in the exemplary embodiments). The ground electrode 20 has a flat plate shape and serves as one surface of the reactor 10. The ground electrode 20 is in contact with raw water to be treated so that the raw water is grounded.

For example, the plasma electrode 30 is made of tungsten or stainless steel (SUS) and is connected to a power supply unit. The power supply unit applies voltage pulses, alternating current (AC) voltage, or direct current (DC) voltage to the plasma electrode 30 to generate underwater discharge plasma.

The plasma electrode 30 is disposed on the second side of the reactor 10 and is preferably installed to face the ground electrode 20. A plurality of the plasma electrodes 30 may be installed depending on the amount of raw water to be treated. The plasma electrode 30 may be an array of electrodes. The array of electrodes may be provided in a form of individual electrodes or in a form of a module (hereinafter, referred to as plasma electrode module 50).

If the plasma electrode module 50 includes the plurality of plasma electrodes 30, the number of plasma electrodes constituting the plasma electrode module 50 is preferably in a range of 2 to 30.

If the plasma electrode module 50 includes a smaller number of plasma electrodes than required, it is difficult to obtain sufficient water treatment efficiency. On the contrary, if the plasma electrode module 50 includes a larger number of plasma electrodes than required, water quality is deteriorated due to a decrease in dissolved oxygen (DO) and cost effectiveness decreases due to the increase in power consumption.

Figure 3:
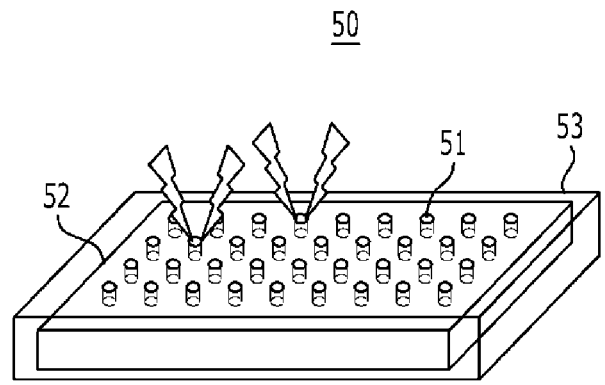
FIGS. 3 and 4 are schematic views illustrating a plasma electrode module according to an exemplary embodiment.
Figure 4:
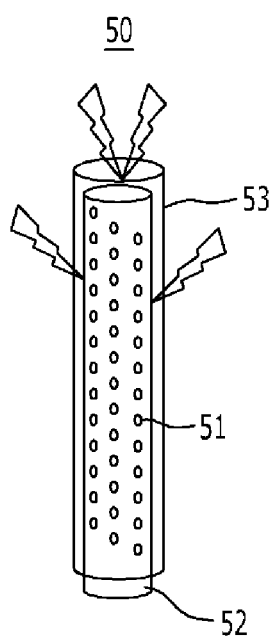

FIGS. 3 and 4 schematically illustrate a plasma electrode module according to an exemplary embodiment. Referring to FIGS. 3 and 4, the plasma electrode module 50 includes a conductive substrate 52 having a plurality of holes 51 and a ceramic layer 53 surrounding a portion of an outer surface of the conductive substrate 52. The multiple plasma electrodes 30 are disposed in the respective holes 51.

The conductive substrate 52 may have a plate shape or a cylinder shape. If the conductive substrate 52 has a plate shape, micro-bubbles can be supplied to a relatively wide area. On the other hand, if the conductive substrate 52 has a cylinder shape, micro-bubbles can be supplied to a relatively narrow area in a relatively high density. Therefore, the form of the conductive substrate 52 is suitably selected depending on its use.

The ceramic layer 53 is formed to partially surround the outer surface of the conductive substrate 52 to protect the conductive substrate 52. Plasma or micro-bubbles generated by the plasma electrodes 30 installed in the respective holes 51 can move along the exposed surface of the conductive substrate 52, which is not covered by the ceramic layer 53.

For example, the ceramic layer 53 may be formed to surround the entire surface of the conductive substrate 52 except for the area in which the holes 51 are formed. That is, the ceramic layer 53 may be formed on the surface of the conductive substrate 52 except for the surface on which the holes 51 are formed. However, it is understood that the shape of the ceramic layer 53 is not limited thereto, and may be changed or vary according to one or more other exemplary embodiments.

A diameter of the holes 51 formed in the conductive substrate 52 is set to be in a range of 1 to 10 mm. If the diameter of the holes 51 is smaller than 1 mm, the size of the holes 51 is smaller than the size of the plasma electrodes 30. Therefore, recombination of plasma radicals generated in the plasma electrode 30 increases, thereby reducing the plasma effect of removing organic materials, microorganisms, or the like. On the other hand, if the diameter of the holes 51 is larger than 10 mm, the size of generated micro-bubbles is excessively large, resulting in deterioration in diffusion of the micro-bubbles. For this reason, the micro-bubbles cannot sufficiently collide with or adhere to flocs, resulting in deterioration in floc removal efficiency.

In addition, the holes 51 are preferably arranged at intervals of 90 mm to 120 mm. This is to generate uniform sizes of micro-bubbles and to control a region in which the micro-bubbles are diffused, thereby increasing flock removal efficiency of the micro-bubbles. For example, if the distance between adjacent holes 51 is less than 90 mm, the probability of collision of micro-bubbles generated in different holes 51 is excessively increased. This produces excessively big bubbles and reduces the chance in which the bubbles adhere to flocs. On the other hand, if the distance between the adjacent holes 51 is greater than 120 mm, turbulence is not sufficiently formed in a lower region between the holes 51. In this case, flocs condensed in water to be treated precipitates, causing a problem of forming a floc cake.

That is, the diameter of the holes 51 is set to be in a range of 1 to 10 mm and the interval between each of the multiple holes 51 is set to be in a range of 90 to 120 mm to generate and preserve micro-bubbles having uniform sizes in a range of 30 to 100 μm to increase the floc removal efficiency by the micro-bubbles.

Figure 5:
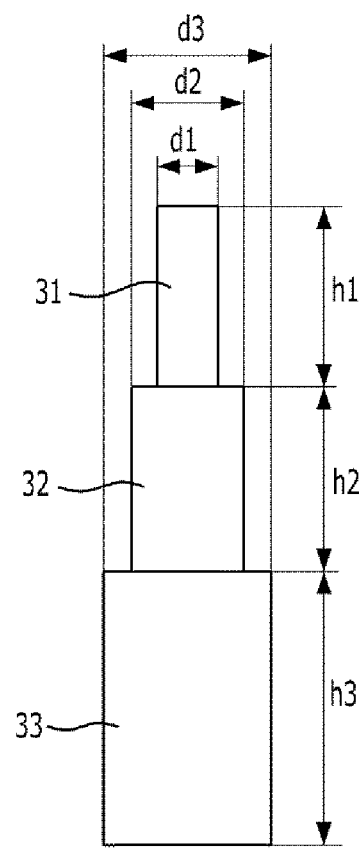
FIG. 5 is a diagram illustrating a plasma electrode.

FIG. 5 is a diagram illustrating the plasma electrode 30. Referring to FIG. 5, the plasma electrode 30 has a multilayer structure in which a ground portion 33 having a cylinder shape, a fixed portion 32, and a discharge portion 31 are sequentially stacked. The ground portion 33 is in contact with the conductive substrate 52, and plasma is generated around the discharge portion 31.

The ground portion 33, the fixed portion 32, and the discharge portion 31 may be integrally formed in a body. That is, the plasma electrode 30 is a one-piece body. In this case, it is possible to prevent one plasma electrode from broken when the plasma electrode 30 is applied with a higher voltage than necessary power. That is, the plasma electrode 30 has high durability, and can be easily replaced if necessary.

The plasma electrode 30 is a one-piece body such that the elements of the plasma electrode 30 are made of the same material having corrosion resistance. Tungsten, tungsten alloy, stainless steel, or the like may be used as the material having corrosion resistance. It is preferable to use stainless steel as the material of the plasma electrode 30.

While a shape of the ground portion 33, the fixed portion 32, and the discharge portion 31 is not particularly limited, it is preferable that the ground portion 33, the fixed portion 32, and the discharge portion 31 have a cylinder shape to stably generate plasma. As illustrated in FIG. 5, the discharge portion 31 that is an uppermost portion has the smallest diameter d1, and the ground portion 33 that is a lowermost portion has the largest diameter d3.

Such an arrangement in which the diameter of the plasma electrode 30 is decreased toward the top is advantageous in terms of an insulation efficiency and a discharge efficiency of the plasma electrode 30. To maximize the insulation efficiency and the discharge efficiency of the plasma electrode 30, a ratio of the diameters d3, d2, and d1 of the ground portion 33, the fixed portion 32, and the discharge portion 31 is preferably 12 to 16:8 to 10:1 to 2 (d3:d2:d1). On the other hand, a ratio of the heights h3, h2, and h1 is preferably 1 to 2:1:1 (h3:h2:h1).

In addition, it is preferable that the diameter of the discharge portion 31 is larger than 1 mm and smaller than 4 mm. If the diameter of the discharge portion 31 is smaller than 1 mm, plasma cannot be sufficiently formed and the production of ozone is insignificant. On the other hand, if the diameter exceeds 4 mm, there is a problem in that plasma cannot be uniformly generated on the surface of the discharge portion 31, and a total amount of ozone that is generated decreases.

Figure 6:
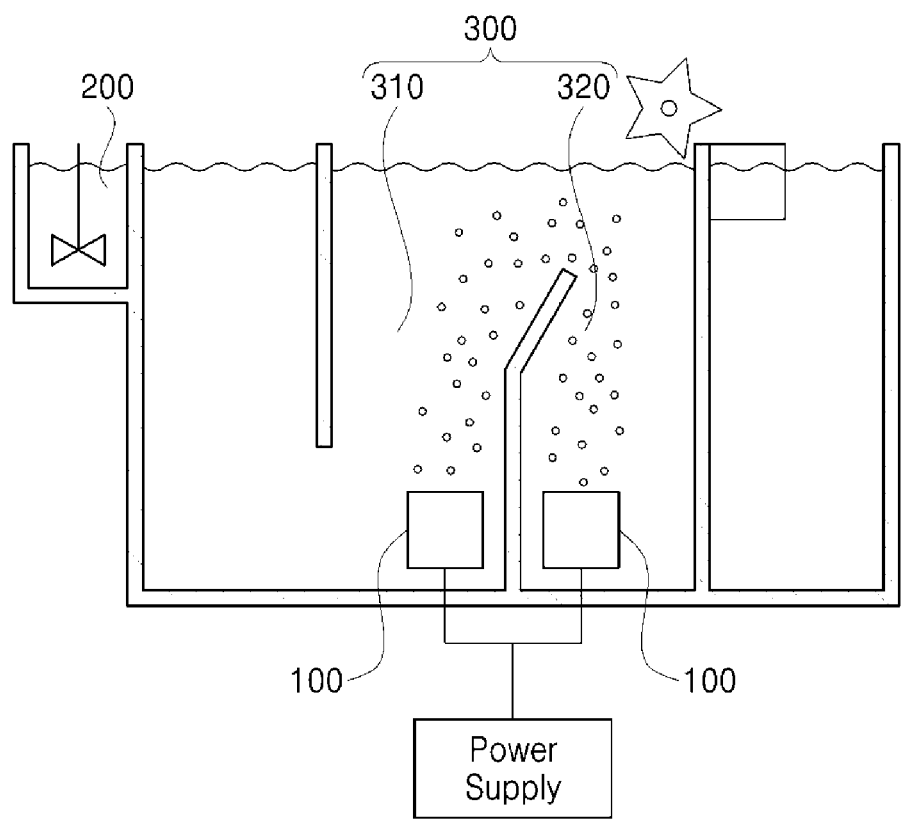
FIG. 6 is a schematic view illustrating a dissolved air flotation (DAF) water treatment system according to an exemplary embodiment.

FIG. 6 is a diagram schematically illustrating a dissolved air flotation (DAF) water treatment system according to an exemplary embodiment. The DAF water treatment system includes a mixing-and-coagulation basin 200 and a flotation basin 300. In the mixing-and-coagulation basin 200, a coagulant is added to and mixed with feed water to form and grow flocs. In the flotation basin 300, micro-bubbles are generated so that the flocs are floated to the water surface by the micro-bubbles, and the flocs are removed from the water surface. Because the flotation basin 300 is provided with the underwater plasma discharge device 100, plasma is generated through underwater electric discharge and micro-bubbles are released.

The mixing-and-coagulation basin 200 is a device that serves to form and grow flocs through conglomeration of suspended particles by injecting and stirring a coagulant into feed water. The type of the coagulant introduced into the mixing-and-coagulation basin 200 is not particularly limited. One example of the coagulant may be $FeCl_3$.

The flotation basin 300 is a device that serves to form bubble-floc agglomerates by bringing micro-bubbles into contact with the grown flocs in the water discharged from the mixing-and-coagulation basin 200, to float the bubble-floc agglomerates to the water surface, and to remove the bubble-floc agglomerates from the water surface.

The flotation basin 300 is divided into a contact region 310 and a separation region 320 by a partition. In the contact region 310, the flocs and the micro-bubbles collide and combine to form the bubble-flock agglomerates which rise to the water surface. In the separation region 320 that is the next stage to the contact region 310, the bubble-flock agglomerates are removed with a scum skimmer or the like.

The underwater plasma discharge device 100 may be provided in the flotation basin 300 as a device for supplying micro-bubbles to the flotation basin 300. Because the underwater plasma discharge device 100 generates plasma and micro-bubbles through underwater electric discharge, both the organic material removal effect by plasma and the floc flotation effect by micro-bubbles can be obtained.

In a related art DAF system, a portion of treated water, which is the final product of the system, is extracted, compressed air is supplied to this extracted treated water to produce air-saturated water, and the air-saturated water is supplied to the contact region 310 of the flotation basin 300 through nozzles. The air-saturated water experiences a rapid pressure drop in the contact region, thereby generating micro-bubbles.

In this case, because a circulation pipe for returning a portion of the treated water to the flotation basin 300 and a compressor for producing the air-saturated water are required, the footprint of the water treatment system is increased for installation of the circulation pipe and a saturated water storage facility. In addition, because energy is required to generate the saturated water, energy consumption is increased.

However, the DAF water treatment system according to the exemplary embodiment can supply micro-bubbles to the flotation basin 300 without requiring the circulation pipe and the saturated water production facility and can remove organic materials with the use of plasma. Therefore, the DAF water treatment system according to the exemplary embodiment has the advantage of improving water treatment efficiency and process operation efficiency.

Because the underwater plasma discharge device 100 used in the exemplary embodiment is the same as the underwater plasma discharge device 100 described with reference to FIGS. 1 to 4, a redundant description will be omitted.

The underwater plasma discharge device 100 may be installed at a bottom of the contact region 310 of the flotation basin 300. Alternatively, the underwater plasma discharge device 100 may be installed at the bottom of each of the contact region 310 and the separation region 320. In the latter case, flocs that have grown late and have not yet formed bubble-floc agglomerates can collide with and combine with micro-bubbles in the separation region 320 to form bubble-floc agglomerates. Therefore, the floc removal efficiency can be increased and the water quality can be improved.

In the flotation basin 300, at least two underwater plasma discharge devices 100 may be connected in series or in parallel. The serial connection is advantageous in terms of being capable of purifying severely contaminated water, and the parallel connection is advantages in terms of being cable of purifying a large amount of water at once.

Test Example 1

The DAF water treatment system illustrated in FIG. 6 was used, and the underwater plasma discharge device 100 was installed only in the contact region 310. A predetermined electric current is applied to the underwater plasma discharge device 100 for a predetermined time. Thereafter, a turbidity and a concentration of total dissolved solids (TSS) of the obtained treated water were measured. The results are shown in Table 1.

In the test, a spacing between the holes 51 of the plasma electrode module 50 was fixed to 100 mm, and a diameter of the holes 51 was varied from 0.5 to 11 mm.

TABLE 1

| | Hole diameter (mm) | Turbidity (NTU) | TSS (mg/L) |
|---|---|---|---|
| Comparative Example 1 | 0.5 | 1.87 | 6.1 |
| Example 1 | 1.5 | 0.92 | 3.2 |
| Example 2 | 4.0 | 0.85 | 2.9 |
| Example 3 | 7.0 | 0.88 | 3.3 |
| Example 4 | 9.5 | 0.94 | 3.0 |
| Comparative Example 2 | 11 | 1.76 | 5.8 |

As shown in Table 1, Examples 1 to 4 show considerably lower turbidity and TSS concentration than Comparative Examples 1 and 2. It is assumed that the effect was obtained because the diameter of the holes 51 was set to be in a range of 1 to 10 mm. This range of hole diameter facilitates the adjustment of the size of micro-bubbles and enables production of a sufficient number of micro-bubbles. From these test results, the diameter of the holes 51 is preferably in the range of 1 mm to 10 mm.

Test Example 2

The DAF water treatment system illustrated in FIG. 6 was used, and the underwater plasma discharge device 100 was installed only in the contact region 310. A predetermined electric current is applied to the underwater plasma discharge device 100 for a predetermined time. Thereafter, the turbidity and the concentration of total dissolved solids (TSS) of the obtained treated water were measured. The results are shown in Table 2.

In the test, a diameter of the holes 51 of the plasma electrode module 50 was fixed to 4 mm, and an interval between the holes 51 was changed from 80 mm to 130 mm.

TABLE 2

| | Hole interval (mm) | Turbidity (NTU) | TSS (mg/L) |
|---|---|---|---|
| Comparative Example 3 | 80 | 1.52 | 5.5 |
| Example 5 | 90 | 0.88 | 3.1 |
| Example 6 | 100 | 0.85 | 2.9 |
| Example 7 | 110 | 0.90 | 3.1 |
| Example 8 | 120 | 0.91 | 3.2 |

TABLE 2-continued

|  | Hole interval (mm) | Turbidity (NTU) | TSS (mg/L) |
|---|---|---|---|
| Comparative Example 4 | 130 | 1.44 | 5.1 |

As shown in Table 2, Examples 5 to 8 are superior to Comparative Examples 3 and 4 in terms of turbidity and TSS concentration. It is assumed that the effect is obtained because a larger hole interval in a range of 90 to 120 mm is advantageous for generation and preservation of micro-bubbles.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A dissolved air flotation water treatment system comprising:
a mixing-and-coagulation basin in which a mixture of feed water and coagulant flows in and agitates the mixture to form and grow flocs in raw flocs water;
a flotation basin in which micro-bubbles are injected into the raw flocs water supplied from the mixing-and-coagulation basin so that the flocs are raised; and
at least two plasma electrode modules including a first plasma electrode module and a second plasma electrode module, the at least two plasma electrode modules disposed underwater in the flotation basin to generate plasma and the micro-bubbles through underwater electric discharge,
wherein each of the at least two plasma electrode modules comprises:
a conductive substrate including a plurality of holes;
a ceramic layer surrounding a portion of an outer surface of the conductive substrate; and
a plasma electrode disposed in each of the plurality of holes,
wherein the plasma electrode has a multilayer structure in which a cylindrical ground portion, a fixed portion, and a discharge portion are sequentially stacked,
the ground portion is in contact with the conductive substrate and the plasma and the micro-bubbles are generated on the discharge portion, and
wherein the flotation basin is divided into a contact region and a separation region by a partition, and the first plasma electrode module is installed in the contact region, and the second plasma electrode module is installed in the separation region,
wherein the contact region allows the flocs in the raw flocs water to collide and combine with the micro-bubbles generated by the first plasma electrode module, thereby forming a first bubble-floc agglomerate, and provide treated raw flocs water containing the first bubble-floc agglomerate therein to the separation region over the partition, and,
wherein the separation region receives the treated raw flocs water containing the first bubble-floc agglomerate provided from the contact region, allows flocs in the treated raw floes water that have grown late and have not yet formed a bubble-floc agglomerate to collide with and combine with micro-bubbles generated by the second plasma electrode module to form a second bubble-floc agglomerate, and allows the first and second bubble-floc agglomerates to be removed.

2. The system according to claim 1, wherein the conductive substrate has a plate shape or a cylinder shape.

3. The system according to claim 1, wherein the ground portion, the fixed portion, and the discharge portion are integrally formed in a cylindrical structure and are made of a same material having corrosion resistance.

4. The system according to claim 3, wherein the discharge portion disposed at a top has a smallest diameter and the ground portion disposed at a bottom has a largest diameter so that a diameter of the plasma electrode decreases toward the top.

5. The system according to claim 1, wherein the ground portion, the fixed portion, and the discharge portion is made of stainless steel (STS).

6. The system according to claim 1, wherein the discharge portion has a diameter in a range of longer than 1 mm and shorter than 4 mm.

7. The system according to claim 1, wherein each of the plurality of holes has a diameter in a range of 1 mm to 10 mm, and the plurality of holes are spaced at intervals ranging from 90 to 120 mm, and such that each of the plurality of holes generate and preserve micro-bubbles having uniform sizes in a range of 30 to 100 μm to increase the floc removal efficiency by the micro-bubbles.

8. The system according to claim 1, wherein an upper part of the partition is bent toward the separation region such that first bubble-floc agglomerate in the treated raw flocs water may be provided smoothly from the contact region to the separation region.

9. A dissolved air flotation water treatment system comprising:
a mixing-and-coagulation basin in which a mixture of feed water and coagulant flows in and agitates the mixture to form and grow floes in raw flocs water,
a flotation basin in which micro-bubbles are injected into the raw flocs water supplied from the mixing-and-coagulation basin so that the flocs are raised; and
at least two plasma discharge devices including a first plasma discharge device and a second plasma discharge device, the at least two plasma discharge devices disposed underwater in the flotation basin to generate plasma and the micro-bubbles through underwater electric discharge,
wherein each of the at least two plasma discharge device comprises:
a reactor having an input port through which the mixture flows in and an output port through which treated mixture flows out;
a ground electrode disposed in a first side of the reactor; and
a plasma electrode module disposed in a second side of the reactor,
wherein the plasma electrode module includes a conductive substrate including a plurality of holes, a ceramic layer surrounding a portion of an outer surface of the conductive substrate, and a plasma electrode disposed in each of the plurality of holes,
wherein the plasma electrode has a multilayer structure in which a cylindrical ground portion, a fixed portion, and a discharge portion are sequentially stacked, the ground portion is in contact with the conductive substrate and the plasma and the micro-bubbles are generated on the discharge portion, and wherein the flotation basin is divided into a contact region and a separation region by a partition, and the first plasma discharge device is installed in the contact region, and the second plasma discharge device is installed in the separation region, wherein the contact region allows the flocs in the raw flocs water to collide and combine with the micro-bubbles generated by the first plasma discharge device, thereby forming a first bubble-floc agglomerate, and provide treated raw flocs water containing the first bubble-floc agglomerate therein to the separation region over the partition, and, wherein the separation region receives the treated raw flocs water containing the first bubble-floc agglomerate provided from the contact region, allows flocs in the treated raw flocs water that have grown late and have not yet formed a bubble-floc agglomerate to collide with and combine with micro-bubbles generated by the second discharge device to form a second bubble-floc agglomerate, and allows the first and second bubble-floc agglomerates to be removed.

10. The system according to claim 9, wherein the conductive substrate has a plate shape or a cylinder shape.

11. The system according to claim 10, wherein the ground portion, the fixed portion, and the discharge portion are integrally formed in a cylindrical structure and are made of a same material having corrosion resistance, and wherein the discharge portion disposed at a top has a smallest diameter and the ground portion disposed at a bottom has a largest diameter so that a diameter of the plasma electrode decreases toward the top.

12. The system according to claim 9, the input port, the output port, and the ground electrode are disposed at a same side of the reactor.

13. The system according to claim 12, wherein the ground electrode and the plasma electrode module are disposed to face each other.

* * * * *